US009374683B2

(12) United States Patent
Lee et al.

(10) Patent No.: US 9,374,683 B2
(45) Date of Patent: Jun. 21, 2016

(54) METHOD AND APPARATUS FOR DEVICE TO DEVICE MULTICAST COMMUNICATION IN CELLULAR MOBILE SYSTEMS

(71) Applicant: Electronics and Telecommunications Research Institute, Daejeon (KR)

(72) Inventors: Sang Ho Lee, Daejeon (KR); Jee Hyeon Na, Daejeon (KR); Dae Ik Kim, Daejeon (KR); Jung Mo Moon, Daejeon (KR); Woo Goo Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 139 days.

(21) Appl. No.: 14/097,876

(22) Filed: Dec. 5, 2013

(65) Prior Publication Data
US 2014/0162643 A1 Jun. 12, 2014

(30) Foreign Application Priority Data

Dec. 6, 2012 (KR) .......................... 10-2012-0140765

(51) Int. Cl.
*H04W 4/00* (2009.01)
*H04W 4/06* (2009.01)
*H04W 76/02* (2009.01)

(52) U.S. Cl.
CPC ................ *H04W 4/06* (2013.01); *H04W 4/008* (2013.01); *H04W 76/023* (2013.01)

(58) Field of Classification Search
CPC ........................................................ H04W 4/06
USPC ........................ 455/435.1, 515; 709/245, 224
See application file for complete search history.

(56) References Cited

U.S. PATENT DOCUMENTS

| 2006/0168343 | A1* | 7/2006 | Ma et al. ........................ 709/245 |
| 2010/0009675 | A1* | 1/2010 | Wijting ................. H04W 72/02 455/426.1 |
| 2010/0040029 | A1* | 2/2010 | Doppler et al. ................ 370/338 |
| 2013/0029712 | A1* | 1/2013 | Shao et al. ..................... 455/515 |
| 2013/0159407 | A1* | 6/2013 | Koskela et al. ................ 709/204 |

FOREIGN PATENT DOCUMENTS

KR 10-2012-0074255 7/2012

* cited by examiner

*Primary Examiner* — David Q Nguyen
(74) *Attorney, Agent, or Firm* — Nelson Mullins Riley & Scarborough LLP; Anthony A. Laurentano (57) ABSTRACT

Disclosed is a method and an apparatus for device-to-device (D2D) multicast communication in a cellular mobile communication system. The method for D2D communication may include transmitting a server designation request message requesting registration as a server terminal to a base station, and transmitting service information using a D2D multicast or broadcast communication scheme based on a radio resource allocated by the base station.

15 Claims, 8 Drawing Sheets

METHOD AND APPARATUS FOR DEVICE TO DEVICE MULTICAST COMMUNICATION IN CELLULAR MOBILE SYSTEMS

CROSS-REFERENCE TO RELATED APPLICATION

This application claims priority to and the benefit of Korean Patent Application No. 10-2012-0140765, filed on Dec. 6, 2012, in the Korean Intellectual Property Office, the disclosure of which is incorporated herein by reference.

BACKGROUND

1. Field of the Invention

Exemplary embodiments relate to a method and an apparatus for device-to-device (D2D) multicast communication in a cellular mobile communication system that may execute a D2D multicast or broadcast communication in a mobile communication system.

2. Description of the Related Art

Recently, a sharp increase in wireless data traffic deserving of being called a mobile big bang is taking place in a mobile communication system. One of the causes of increasing wireless traffic is a mobile social service that has a characteristic of an increasing amount of data exchanged between mobile terminals. To process a sharp increase in traffic of a mobile communication network, various off-loading methods have been studied to improve a wireless transmission rate, and in particular, a technology for direct communication between terminals based on mobile communication or a device-to-device (D2D) communication technology that increases a capacity of a radio resource and expands a coverage area of a cellular network through a direct communication between terminals is gaining attention these days.

A technology for direct communication between terminals based on fourth generation (4G) mobile communication such as long term evolution (LTE) has only recently been studied and discussed for standardization. A current technology enabling direct communication between mobile terminals may include, for example, wireless fidelity (WiFi) Direct or Bluetooth, and is based on a different frequency domain and technology from that of mobile communication.

A technology for direct communication between terminals based on mobile communication is similar to WiFi Direct or Bluetooth in terms of direct communication between mobile terminals, but there is a basic and significant difference in that a mobile terminal executes a direct communication between terminals using a frequency band used for communication with a base station. It is expected that this difference may lead to an increase in capacity and an expansion of a cell coverage of a mobile communication network and development of a differentiated application service. For example, when WiFi and Bluetooth functions are embedded together in a multi-mode in a mobile communication terminal like a majority of recent smart phones, a wireless function of mobile communication is generally always-on anywhere. This aims to reduce power of a multimode terminal and is a basic characteristic of mobile communication. Accordingly, it may be the most appropriate to use a wireless function of mobile communication in measuring proximity to search for a nearby terminal for direct communication between terminals.

As one of the technologies for direct communication between terminals based on mobile communication, reference may be made to Korean Patent Publication No. 10-2012-0100833, published on Sep. 12, 2012, titled "*Method of executing direct communication between terminals and terminal for supporting the same*", in which a direct communication is executed between a first terminal and a second terminal using a common direct communication resources that is commonly allocated to all cells and has a fixed size and position.

However, as an international standardization organization has only recently started to discuss a technology for direct communication between terminals based on mobile communication, researches are being conducted over the world, but focus on a peer-to-peer direct communication technology between terminals still remaining at an initial level.

Accordingly, there is a demand for a method of providing a service via broadcast within a particular region to which it is expected to provide the service most effectively by applying a technology for direct communication between terminals in a mobile communication network, for example, regional advertising or regional broadcasting.

SUMMARY

An aspect of the present invention provides a method and apparatus for device-to-device (D2D) multicast communication in a cellular mobile communication system that may provide a one-to-many communication scheme such as a multicast or broadcast transmission scheme in a mobile communication network.

Another aspect of the present invention also provides a method and apparatus for D2D multicast communication in a cellular mobile communication system that may provide a service via broadcast within a particular area based on a D2D communication technology.

Still another aspect of the present invention also provides a method and apparatus for D2D multicast communication in a cellular mobile communication system that may improve efficiency of radio resource usage.

According to an aspect of the present invention, there is provided a method for executing a D2D communication in an apparatus for D2D communication, the method including transmitting a server designation request message requesting registration as a server terminal to a base station, and transmitting service information using a D2D multicast or broadcast communication scheme based on a radio resource allocated by the base station.

In a case in which an apparatus for D2D communication operating as a server terminal enters a cell of the base station, and in a case in which the apparatus for D2D communication intends to operate as a server terminal, the server designation request message may be transmitted from the corresponding apparatus for D2D communication to the base station.

The server designation request message may include information associated with at least one of a type, a period of time, and a quality of a service provided by the apparatus for D2D communication.

The method may further include, before the transmitting, selecting a D2D communication scheme among a D2D multicast communication scheme and a D2D broadcast communication scheme, and the transmitting may include transmitting the service information using the selected D2D communication scheme.

The service information may include at least one of data of a service provided by the apparatus for D2D communication and a signal for measuring proximity between the apparatus for D2D communication and a receiving terminal receiving the service information.

The transmitting may include, in a case in which the service information is transmitted using a D2D multicast communication scheme, encrypting the data and transmitting at least one of the encrypted data and the signal for measuring proximity.

The method may further include, after transmitting the at least one of the encrypted data and the signal for measuring proximity, verifying a service use authority of a terminal that desires to receive the service, and transmitting an encryption key for decoding the encrypted data to the terminal through the base station.

The transmitting may include transmitting the signal for measuring proximity rather than the encrypted data when a terminal that desires to receive the service is determined to be absent, in a case in which the service information is transmitted using the D2D multicast communication scheme.

The radio resource may correspond to a static uplink resource within a preset time interval, and may be partitioned and allocated along a time or frequency axis in a case in which service areas overlap between server terminals.

According to another aspect of the present invention, there is provided a method for executing a D2D communication in an apparatus for D2D communication, the method including obtaining, from a base station, information associated with a server terminal transmitting service information using a D2D multicast or broadcast communication scheme within a cell of the base station, searching for a server terminal able to execute a D2D communication based on the information associated with the server terminal, and receiving service information transmitted from the found server terminal.

According to still another aspect of the present invention, there is provided a method of supporting a D2D communication in an apparatus for supporting a D2D communication, the method including allocating a radio resource to a server terminal transmitting service information using a D2D multicast or broadcast communication scheme, based on a server designation request message requesting registration as a server terminal being received from the server terminal, and transmitting information associated with the server terminal to a terminal located within a cell of a base station.

According to yet another aspect of the present invention, there is provided an apparatus for executing a D2D communication, the apparatus including a request unit to transmit a server designation request message requesting registration as a server terminal to a base station, a selection unit to select a D2D communication scheme among a D2D multicast communication scheme and a D2D broadcast communication scheme based on a radio resource allocated by the base station, and a transmission unit to transmit data using the selected D2D communication scheme.

According to further another aspect of the present invention, there is provided an apparatus for executing a D2D communication, the apparatus including an obtaining unit to obtain, from a base station, information associated with a server terminal transmitting service information using a D2D multicast or broadcast communication scheme within a cell of the base station, a search unit to search for a server terminal able to execute a D2D communication based on the information associated with the server terminal, and a receiving unit to receive service information transmitted from the found server terminal.

According to another aspect of the present invention, there is provided an apparatus for supporting a D2D communication, the apparatus including an allocation unit to allocate a radio resource to a server terminal transmitting service information using a D2D multicast or broadcast communication scheme, based on a server designation request message requesting registration as a server terminal being received from the server terminal, and a transmission unit to transmit information associated with the server terminal to a terminal located within a cell of a base station.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
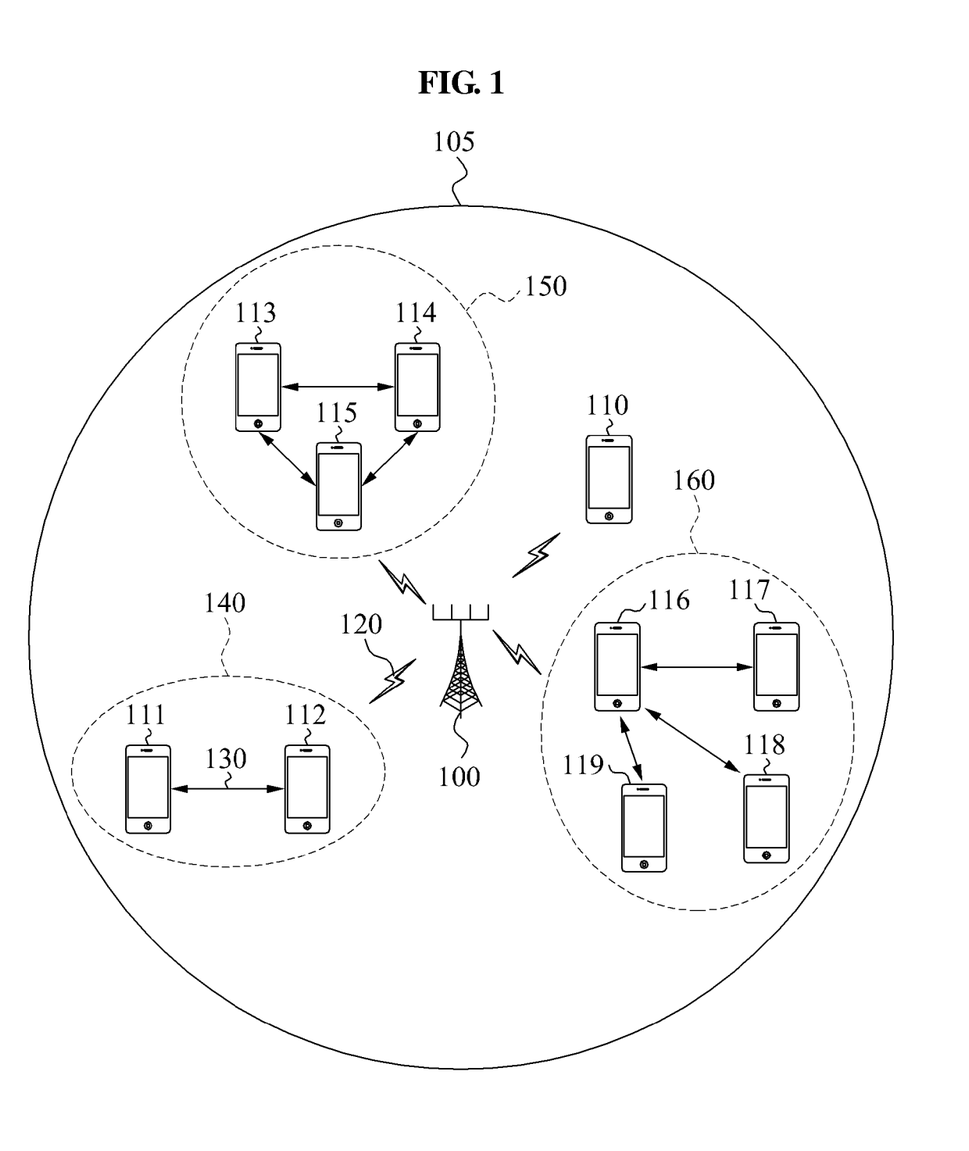
FIG. 1 is a diagram illustrating an example of a concept of device-to-device (D2D) communication in a mobile communication network.

FIG. 1 is a diagram illustrating an example of a concept of device-to-device (D2D) communication in a mobile communication network. Although FIG. 1 shows a base station 100 and terminals 111~119 as an example, the base station 100 may be understood as a concept encompassing a mobile communication core network located at a backend of the base station 100. The same concept is applied to subsequent drawings.

A mobile communication system being currently served may have a structure of receiving a mobile communication service through connection between the base station 100 and the terminals 110~119 via a cellular link 120. However, recently, a D2D communication technology has been proposed with an aim to increase a capacity and a coverage area of a cell 105. The D2D communication technology enables a direct communication between the terminals 111~119 via a D2D link 130 rather than communications between the terminals 110~119 and the base station 100.

Within the cell 105, the terminals 111~119 that execute D2D communications and the terminal 110 that does not execute a D2D communication may coexist. In this instance, the base station 100 may partition an entire radio resource allocated to a cell of the base station 100 dynamically and may allocate the radio resource to the terminals 111~119 executing D2D communications, and may schedule the radio resource allocation for the terminal 110 that does not execute a D2D communication as well as the terminals 111~119 executing D2D communications.

When a D2D communication, for example, a direct communication between a first terminal 111 and a second terminal 112 is executed, the D2D communication may have an effect of reducing a radio resource usage by half, when compared to that of conventional communication between the first terminal 111 and the second terminal 112 through the base station 100 (for example, first terminal-→base station-→second terminal, that is, two hops).

In this instance, the D2D communication may enable both one-to-one connection setting such as a first area 140 and one-to-many connection setting such as a second area 150 or a third area 160, and may enable dynamic setting of the plurality of D2D communication areas 140, 150, and 160 in the cell 150 by applying, for example, a power control technology under an assumption of communication between terminals located geographically proximate to one another.

Figure 2:
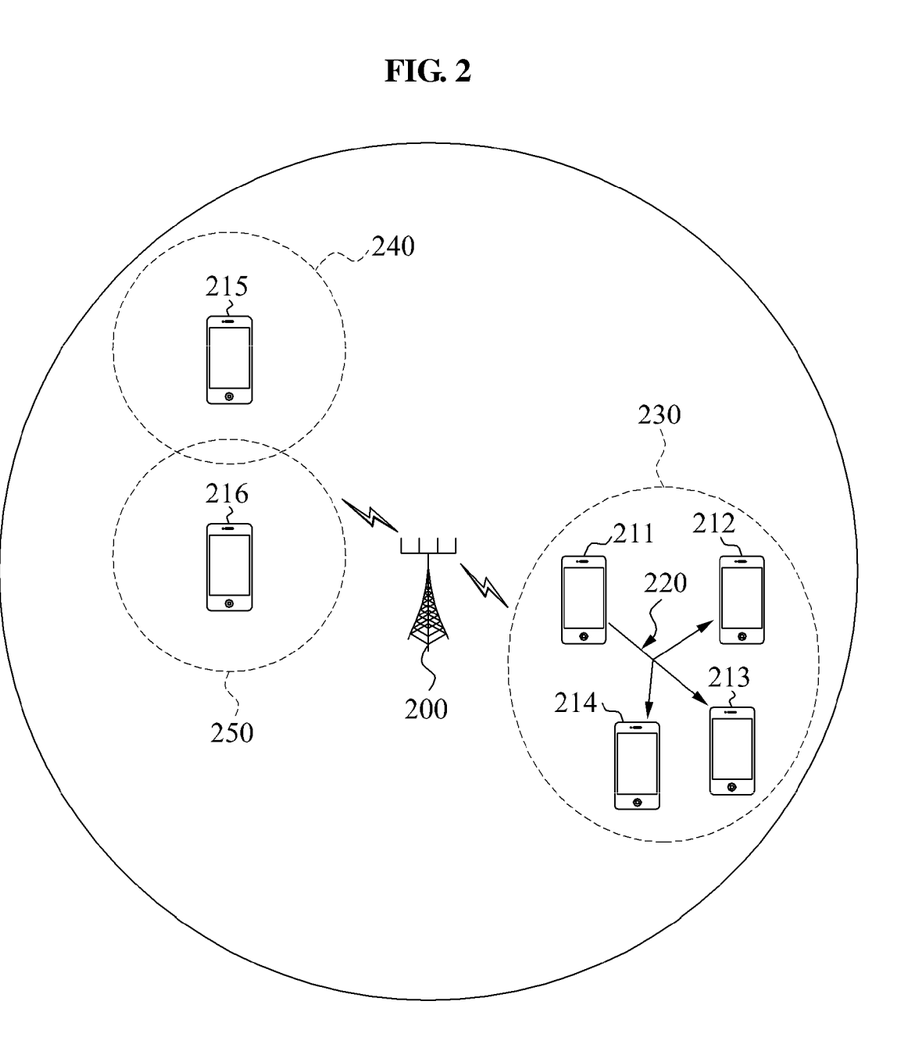
FIG. 2 is a diagram illustrating an example of a D2D multicast communication according to an exemplary embodiment.

FIG. 2 is a diagram illustrating an example of a D2D multicast communication according to an exemplary embodiment.

Taking the third D2D communication area 160 of FIG. 1 as an example, a sixth terminal 116 may establish a one-to-three D2D unicast communication link with a seventh terminal 117, an eighth terminal 119, and a ninth terminal 119. However, when information being transmitted via each link is the same, a base station 200 may create a broadcast link using multicast or broadcast to improve efficiency of radio resource usage, as shown in a first area 230 of FIG. 2.

To execute a D2D broadcast communication, a server terminal 211 may transmit a broadcast-type service (D2D multicast service) and receiving terminals 212, 213, and 214 may receive the service. In this instance, because a one-to-many communication is executed, the server terminal 211 may not perform a data re-transmission function, for example, a hybrid automatic repeat request (HARD) and an ARQ, dissimilar to one-to-one communication.

As shown in FIG. 2, a plurality of D2D multicast communication areas 230, 240, and 250 may be within a cell, and may overlap partially or almost entirely. Even though service areas overlap, the base station 200 may provide a service without interference between server terminals 211, 215, and 216 by partitioning a radio resource to be allocated for a D2D multicast communication along a time or frequency axis and by allocating the radio resource.

Figure 3:
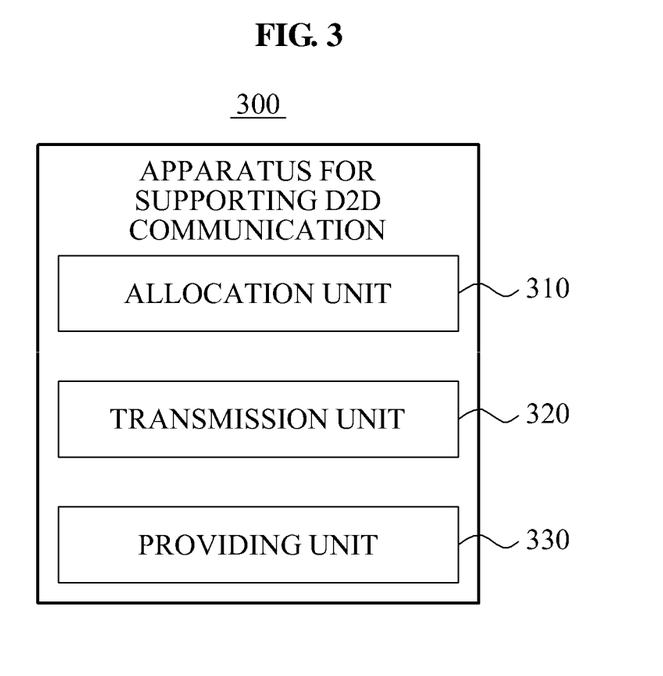
FIG. 3 is a block diagram illustrating an apparatus for supporting D2D communication according to an exemplary embodiment.

FIG. 3 is a block diagram illustrating an apparatus for supporting D2D communication according to an exemplary embodiment.

The apparatus for supporting D2D communication according to an exemplary embodiment may be implemented as a base station, or may be implemented as a separate device that may be included in a base station, to support a D2D communication between a server terminal and a receiving terminal. The apparatus for supporting a D2D communication may include an allocation unit 310, a transmission unit 320, and a providing unit 330.

When a server designation request message requesting registration as a server terminal is received from a server terminal transmitting service information using a D2D multicast or broadcast communication scheme, the allocation unit 310 may judge a radio resource state and a service policy within a cell based on the server designation request message, and may allocate a radio resource to the corresponding server terminal. Here, the server designation request message may include information associated with a type, a period of time, a quality of a service provided by the corresponding server terminal.

The transmission unit 320 may transmit information associated with the server terminal, to which the radio resource is allocated, to a terminal located within the cell. In this instance, the radio resource allocated to the server terminal may correspond to a static uplink resource within a preset time interval, and may be partitioned and allocated along a time or frequency axis in a case in which service areas overlap between server terminals.

In a case in which the server terminal executes a D2D multicast communication and data of the service provided by the server terminal is encrypted, when an encryption key request message is received from the receiving terminal, the providing unit 330 may verify an authority of the receiving terminal requesting an encryption key if functions of authority verification and encryption with respect to the corresponding service are possible, and may provide an encryption key for the corresponding service to the corresponding receiving terminal when the corresponding receiving terminal has a service authority. If the functions of authority verification and encryption with respect to the corresponding service are impossible, the providing unit 330 may transmit the encryption key request message to the corresponding server terminal, may receive an encryption key from the corresponding server terminal, and may provide the encryption key to the corresponding receiving terminal.

Figure 4:
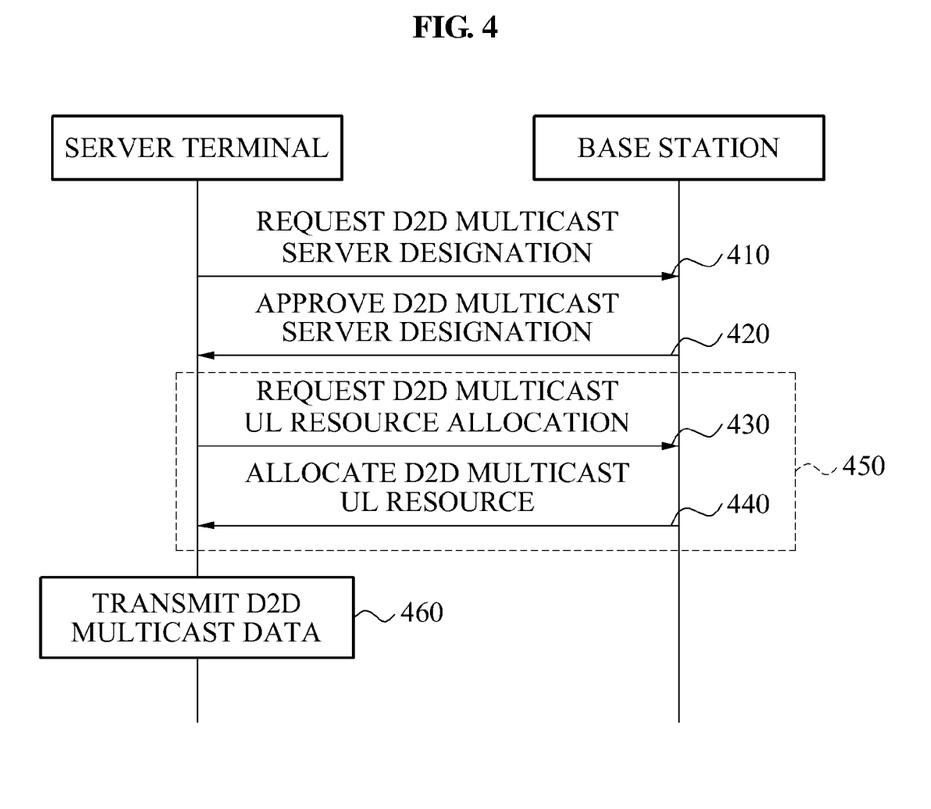
FIG. 4 is a timing diagram illustrating a procedure of setting a server terminal and allocating a resource by a base station according to an exemplary embodiment.

FIG. 4 is a timing diagram illustrating a procedure of setting a server terminal and allocating a resource by a base station according to an exemplary embodiment. Hereinafter, in a case in which the apparatus for supporting D2D communication according to an exemplary embodiment is implemented as a base station, a procedure of setting a server terminal and allocating a resource is described.

For a terminal within a cell to operate as a server terminal, a procedure of registering the terminal as a server terminal in a base station may be performed beforehand. In operation 410, for example, when a terminal operating as a server terminal enters a cell of a particular base station or a particular terminal intends to operate as a server terminal, the corresponding terminal may transmit a D2D multicast server designation request message to a base station. The D2D multicast server designation request message may include information associated with a service to be provided such as, for example, a service type, a service period, and a service quality.

In operation 420, when the base station receives the D2D multicast server designation request message, the base station may judge a radio resource state in the cell and a service policy comprehensively, and may transmit a result message to the D2D multicast server designation request message, that is, a D2D multicast server designation approval message, to the corresponding terminal.

In operation 430, the terminal approved to operate as a D2D multicast server terminal may transmit a radio resource allocation request message necessary for D2D multicast service transmission to the base station before the multicast service is initiated. Because D2D communication involves a receiving terminal receiving information transmitted from a transmitting terminal via uplink (UL), the receiving terminal may receive downlink (DL) information transmitted from the base station and uplink information transmitted from the D2D transmitting terminal. Accordingly, the message transmitted from the multicast server terminal to the base station for D2D multicast transmission may correspond to an allocation request message for a UL resource.

In operation 440, when the base station receives the resource allocation request, the base station may allocate a resource to the corresponding terminal based on characteristics of a broadcast-type service, while considering a resource state. In this instance, the base station may execute static or semi-static resource allocation to the corresponding terminal within an arbitrary time interval according to characteristics of a broadcast-type service. Accordingly, the D2D multicast resource allocation procedure may be performed iteratively within a service time interval periodically or aperiodically in operation 450, as shown in FIG. 4.

In operation 460, the D2D multicast server terminal to which the resource is allocated may transmit multicast data during an allocated resource interval.

Figure 5:
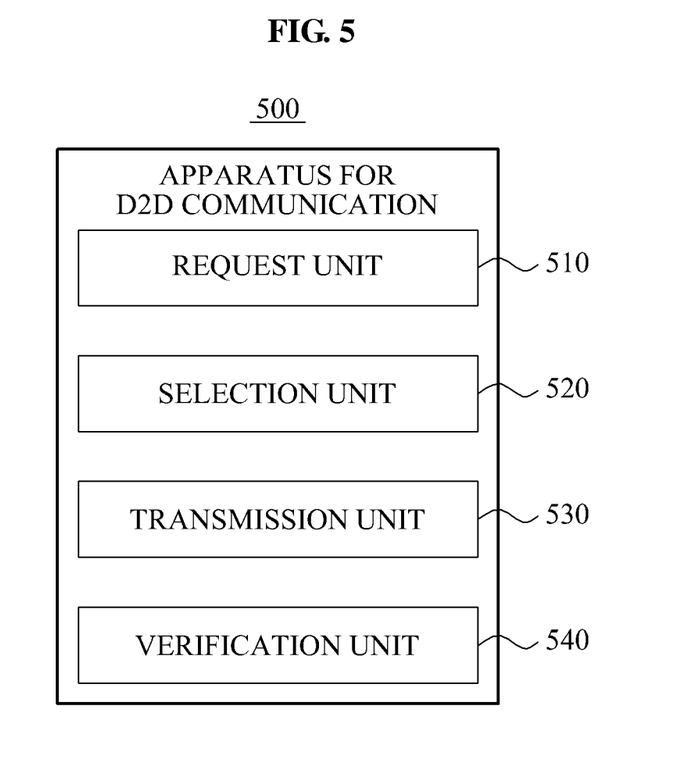
FIG. 5 is a block diagram illustrating a configuration of an apparatus for D2D communication operating as a server terminal according to an exemplary embodiment.

FIG. 5 is a block diagram illustrating a configuration of an apparatus 500 for D2D communication operating as a server terminal according to an exemplary embodiment.

Referring to FIG. 5, to operate as a server terminal, the apparatus 500 for D2D communication may include a request unit 510, a selection unit 520, a transmission unit 530, and a verification unit 540.

The request unit 510 may transmit a server designation request message requesting registration as a server terminal to a base station. Here, in a case in which an apparatus for D2D communication operating as a server terminal enters a cell of the base station and in a case in which the apparatus for D2D communication intends to operate as a server terminal, the server designation request message may be transmitted from the corresponding apparatus for D2D communication to the base station. Also, the server designation request message may include information associated with at least one of a type, a period of time, and a quality of a service provided by the apparatus 500 for D2D communication.

The selection unit 520 may select one D2D communication scheme among a D2D multicast communication scheme and a D2D broadcast communication scheme when a radio resource is allocated by the base station through the server designation request message. In this instance, the radio resource may correspond to a static uplink resource within a preset time interval, and when service areas overlap between server terminals, may be partitioned and allocated along a time or frequency axis.

The transmission unit 530 may transmit service information using a D2D multicast or broadcast communication scheme based on the radio resource allocated by the base station. In this instance, the transmission unit 530 may transmit the service information using the D2D communication scheme selected by the selection unit 520. Here, the service information may include at least one of data of the service provided by the apparatus 500 for D2D communication and a signal for measuring proximity between the apparatus 500 for D2D communication and a receiving terminal receiving the service information.

For example, in a case in which the service information is transmitted using a D2D multicast communication scheme, the data may be encrypted. In this case, the transmitting unit 530 may transmit the encrypted data and the signal for measuring proximity between the apparatus 500 for D2D communication and the receiving terminal receiving the service information, or may transmit only the signal for measuring proximity, depending on the presence or absence of a terminal that desires to receive the service of the apparatus 500 for D2D communication.

When the terminal that desires to receive the service of the apparatus 500 for D2D communication requests an encryption key as the data of the service provided by the apparatus 500 for D2D communication is encrypted, the verification unit 540 may verify a service use authority of the corresponding terminal. Also, the verification unit 540 may transmit an encryption key for decoding the encrypted data to the corresponding terminal through the base station.

Figure 6:
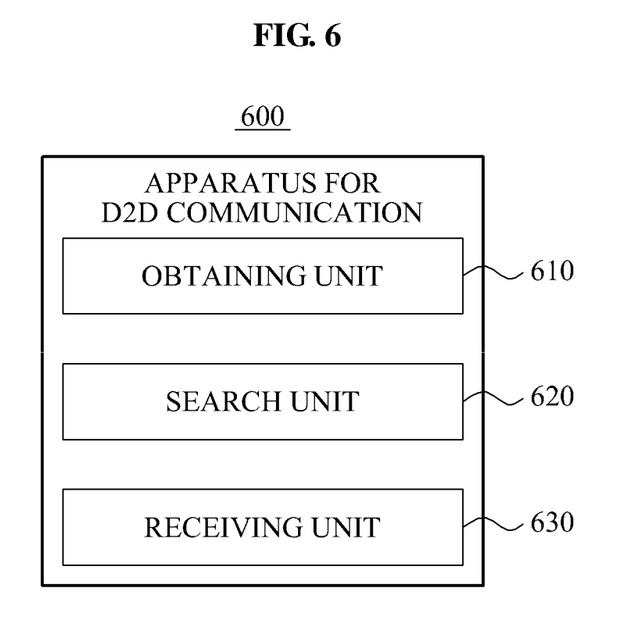
FIG. 6 is a block diagram illustrating a configuration of an apparatus for D2D communication operating as a receiving terminal according to an exemplary embodiment.

FIG. 6 is a block diagram illustrating a configuration of an apparatus 600 for D2D communication operating as a receiving terminal according to an exemplary embodiment.

Referring to FIG. 6, to operate as a receiving terminal, the apparatus 600 for D2D communication may include an obtaining unit 610, a search unit 620, and a receiving unit 630.

The obtaining unit 610 may obtain, from a base station, information associated with a server terminal transmitting service information using a D2D multicast or broadcast communication scheme within a cell of the corresponding base station. Here, the information associated with the server terminal may include information associated with a type of a service provided by the corresponding server terminal and information associated with a radio resource allocated to the corresponding server terminal. Also, the information associated with the server terminal may be obtained when the apparatus 600 for D2D communication enters the cell of the corresponding base station, or may be obtained periodically. The service information may include at least one of data of the service provided by the server terminal and a signal for measuring proximity between the server terminal and the apparatus 600 for D2D communication.

The search unit 620 may search for a server terminal able to execute D2D communication based on the information associated with the server terminal obtained by the obtaining unit 610. For example, the search unit 620 may select a server terminal that desires to receive a service based on the information associated with the server terminal, may search for a server terminal able to execute D2D communication based on a received quality of service information transmitted from the selected server terminal.

The receiving unit 630 may receive service information transmitted from the server terminal searched for by the search unit 620.

Although not shown in FIG. 6, in a case in which the server terminal transmits a signal for measuring proximity rather than data, the apparatus 600 for D2D communication may further include a transmission unit to transmit a reception request message for the data to the server terminal through the base station.

In a case in which data received from the server terminal is encrypted, the transmission unit may transmit an encryption key request message for decoding the encrypted data to the corresponding server terminal through the base station. Accordingly, the receiving unit 630 may receive an encryption key for decoding the encrypted data from the corresponding server terminal through the base station.

Figure 7:
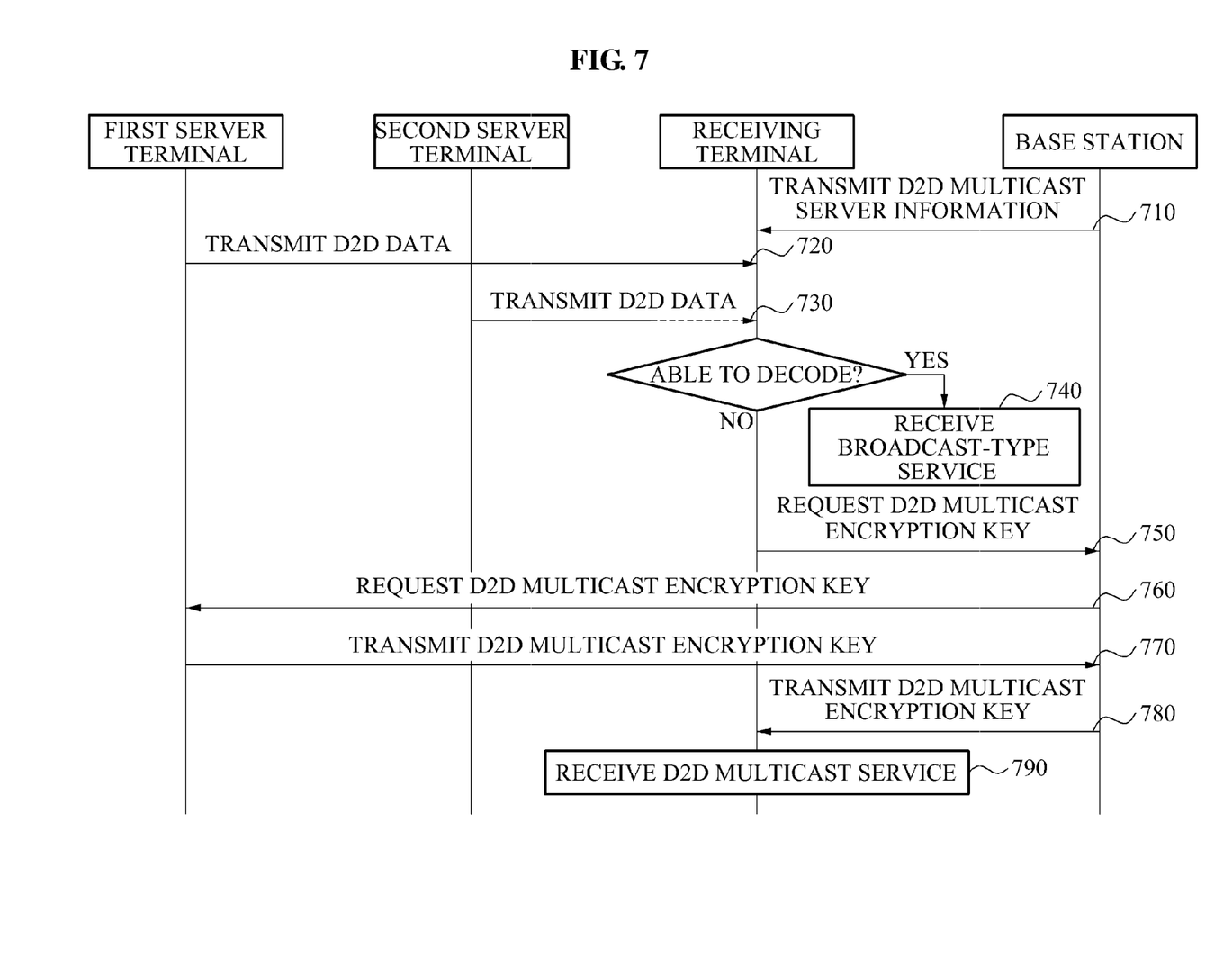
FIG. 7 is a timing diagram illustrating a procedure of receiving a D2D multicast communication service in a receiving terminal according to an exemplary embodiment.

FIG. 7 is a timing diagram illustrating a procedure of receiving a D2D multicast communication service in a receiving terminal according to an exemplary embodiment.

In operation 710, when a terminal operating as a D2D multicast receiving terminal enters a corresponding cell or a particular terminal is set to be a D2D multicast receiving terminal, the corresponding terminal may receive information associated with a D2D multicast server terminal in the cell from a base station.

The information associated with the D2D multicast server terminal may include a multicast service type for each server terminal and radio resource allocation information, for example, a transmission time and a frequency location, and when the base station may enable location management for each server terminal, location information of each server terminal may be included. For example, when the base station may enable location management for each server terminal, the base station may provide information associated with the server terminals in an order of proximity of the server terminals to a location of the receiving terminal accessing the base station. The base station may perform operation 710 of transmitting D2D multicast server information periodically in consideration of a state change of the server terminals within the cell.

In operations 720 and 730, because the D2D multicast server terminals provide a broadcast-type service, the D2D multicast server terminals may transmit D2D data or information for measuring proximity within a resource interval allocated to the server terminals. When a service desired to receive is present based on the multicast server information received from the base station, the D2D multicast receiving terminal may receive an uplink resource transmitted from the corresponding server terminal and may determine whether a D2D communication is possible.

In FIG. 7, transmission of D2D data from a first server terminal and a second server terminal is illustrated as an example. The following description is provided, taking, as an example, a case in which a distance between the first server terminal and the receiving terminal is valid for D2D communication between the terminals and a distance between the second server terminal and the receiving terminal is of a low received quality and invalid for D2D communication between the terminals.

In operation 740, when the D2D data transmitted from the first server terminal is of a received quality enabling D2D communication and is adequate for decoding received data in an upper layer, the receiving terminal may be in a state of being able to receive the broadcast-type service transmitted from the first server terminal. Here, a service with no need for authority verification due to the non-encrypted D2D data may be termed as a broadcast service. Because this state allows even an unauthorized terminal to receive a service, the receiving terminal may be in a broadcast service mode.

In contrast, a case in which only an authorized terminal is allowed to receive a service through data encryption in an upper layer may be termed as a multicast service. The following description is provided, taking, as an example, a case in which a received quality is of a level enabling D2D communication but decoding of received data is impossible when the received data is encrypted.

In this case, the terminal may transmit a D2D multicast encryption key request message to the base station in operation 750. In this instance, in a case in which the base station has functions of authority verification and encryption with respect to the corresponding multicast service, the base station may verify an authority of the terminal requesting an encryption key and when the terminal is verified to have a service authority, may transmit an encryption key for the corresponding multicast service.

However, when the base does not have functions of authority verification and encryption with respect to the corresponding multicast service, the base station may transmit the D2D multicast encryption key request message to the corresponding D2D multicast server terminal, as shown in FIG. 7. In this case, the D2D multicast server terminal may verify a service authority of the terminal requesting an encryption key and when the terminal is verified to have the service authority, may transmit an encryption key to the base station, in operation 770. In operation 780, the base station may transmit the encryption key received from the D2D multicast server terminal to the corresponding receiving terminal.

In operation 790, when the receiving terminal obtains the encryption key, the receiving terminal may decode the D2D data to receive the multicast service. In operations 750 through 780 of obtaining the multicast service encryption key, the D2D multicast receiving terminal may communicate with the D2D multicast server terminal directly without relaying of the base station. However, in this case, the D2D multicast server terminal may establish a separate D2D unicast link for each of all receiving terminals, which may reduce efficiency as a number of receiving terminals increases.

Figure 8:
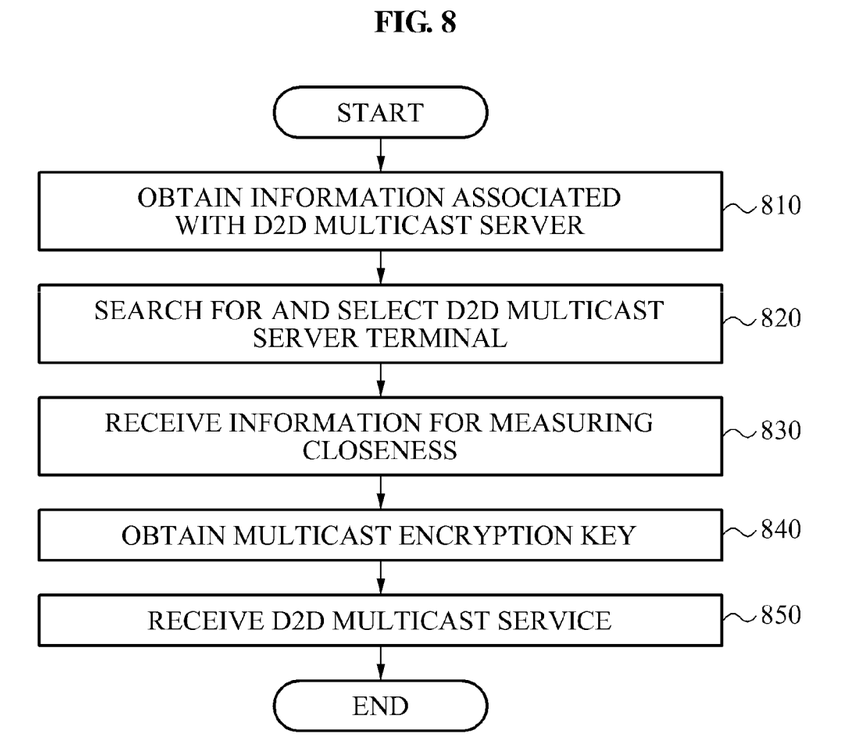
FIG. 8 is a flowchart illustrating a process of receiving a D2D multicast communication service in a receiving terminal according to an exemplary embodiment.

FIG. 8 is a flowchart illustrating a procedure of receiving a D2D multicast communication service in a receiving terminal according to an exemplary embodiment.

In operation 810, a D2D multicast receiving terminal may obtain information associated with D2D multicast server terminals in a cell from a base station because recognizing the D2D multicast server terminals in the cell is required for a D2D terminal to receive a D2D multicast service. The information associated with the server terminal may include information associated with a type of a multicast service provided by the server terminal and information associated with a radio resource allocated to the server terminal, necessary for determining proximity with the server terminal. The information associated with the D2D multicast server terminal may be obtained from the base station when the D2D terminal accesses the cell initially. Also, the information associated with the D2D multicast server terminal may be broadcast periodically from the base station to inform a state change of the server terminal within the cell.

When the D2D terminal obtains the information associated with the D2D multicast terminal, the D2D terminal may search for a server terminal able to execute a D2D communication with the D2D terminal. The D2D multicast server terminal may operate in a broadcast mode in which the D2D multicast server terminal may transmit data all the time irrespective of whether a terminal receiving data transmitted from the D2D multicast server terminal is present or absent and whether the receiving terminal has a service authority, and a multicast mode in which the D2D multicast server terminal provides a service to only an authorized terminal. When a receiving terminal is determined to be absent, the multicast mode may disallow transmission of multicast data and may allow transmission of information for determining proximity, for example, a sounding reference signal (SRS). When the D2D receiving terminal receives the data or SRS transmitted from the D2D multicast server terminal, the D2D receiving terminal may judge whether D2D communication is possible based on a received quality, and may select a server terminal that will participate in the service, in operation 820.

In operation 830, in a case in which the receiving terminal is able to provide a normal service by decoding the data transmitted from the D2D server terminal, the receiving terminal may receive the D2D broadcast service transmitted from the corresponding server terminal.

However, when decoding is impossible or the selected server terminal is in a state of being able to transmit only information for determining proximity or SRS, but not data in operation 830, the receiving terminal may request reception of the corresponding multicast service through the base station and the base station may transmit the request to the corresponding D2D multicast server terminal. The D2D server terminal may verify a service use authority of the receiving terminal and may transmit an encryption key necessary for decoding the multicast data to the corresponding D2D terminal through the base station in operation 840. Then, because the receiving terminal is verified, the server terminal may transmit the D2D multicast data.

In operation 850, the D2D terminal obtaining the multicast encryption key may receive a normal service by decoding the received multicast data using the encryption key.

Accordingly, the method and apparatus for D2D communication according to the exemplary embodiments may obtain information associated with a resource for data transmission from a base station and may receive service information provided by a D2D multicast server terminal, without using a separate multicast or broadcast address, for example, a multicast/broadcast IP address and a multicast multimedia access control (MAC) address. That is, the multicast service may be provided implicitly through D2D communication.

According to the exemplary embodiments, service information may be transmitted using a one-to-many communication scheme such as a multicast or broadcast transmission scheme in a mobile communication network, by transmitting a server designation request message requesting registration as a server terminal to a base station, enabling a radio resource to be allocated by the base station, and transmitting service information using a D2D multicast or broadcast communication scheme based on the allocated radio resource.

According to the exemplary embodiments, a service may be provided via broadcast within a particular area based on a D2D communication technology, by transmitting service information using a one-to-many communication scheme such as a multicast or broadcast transmission scheme in a mobile communication network.

According to the exemplary embodiments, radio resource usage may be increased in proportion to a number of receivers receiving a corresponding service, resulting in an improved capacity of a mobile communication network when compared to D2D communication via unicast.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method for executing a device-to-device (D2D) communication in an apparatus for D2D communication, the method comprising:
   transmitting a server designation request message requesting registration as a server terminal to a base station; and
   transmitting service information using a D2D multicast or broadcast communication scheme based on a radio resource allocated by the base station
   wherein a state of the radio resource is judged based on the server designation request message,
   wherein the service information includes at least one of data of a service provided by the apparatus for D2D communication and a signal for measuring proximity between the apparatus for D2D communication and a receiving terminal receiving the service information, and
   wherein the transmitting comprises, in a case in which the service information is transmitted using the D2D multicast communication scheme, encrypting the data and transmitting at least one of the encrypted data and the signal for measuring proximity.

2. The method of claim 1, wherein, in a case in which an apparatus for D2D communication operating as a server terminal enters a cell of the base station, and in a case in which the apparatus for D2D communication intends to operate as a server terminal, the server designation request message is transmitted from the corresponding apparatus for D2D communication to the base station.

3. The method of claim 1, wherein the server designation request message includes information associated with at least one of a type, a period of time, and a quality of a service provided by the apparatus for D2D communication.

4. The method of claim 1, further comprising:
   before the transmitting,
   selecting a D2D communication scheme among a D2D multicast communication scheme and a D2D broadcast communication scheme, and
   wherein the transmitting comprises transmitting the service information using the selected D2D communication scheme.

5. The method of claim 1, further comprising:
   after transmitting the at least one of the encrypted data and the signal for measuring proximity,
   verifying a service use authority of a terminal that desires to receive the service; and
   transmitting an encryption key for decoding the encrypted data to the terminal through the base station.

6. The method of claim 1, wherein the transmitting comprises transmitting the signal for measuring proximity rather than the encrypted data when a terminal that desires to receive the service is determined to be absent, in a case in which the service information is transmitted using the D2D multicast communication scheme.

7. The method of claim 1, wherein the radio resource corresponds to a static uplink resource within a preset time interval, and is partitioned and allocated along a time or frequency axis in a case in which service areas overlap between server terminals.

8. A method for executing a device-to-device (D2D) communication in an apparatus for D2D communication, the method comprising:
   obtaining, from a base station, information associated with a server terminal transmitting service information using a D2D multicast or broadcast communication scheme within a cell of the base station;
   searching for a server terminal able to execute a D2D communication based on the information associated with the server terminal;
   wherein the information associated with the server terminal includes information associated with a type of a service provided by the server terminal and information associated with the radio resource allocated to the server terminal, and
   wherein the service information includes at least one of data of the service provided by the server terminal and a signal for measuring proximity between the server terminal and the apparatus for D2D communication;
   transmitting a server designation request message requesting registration as the server terminal to the base station, wherein a state of a radio resource is judged based on the server designation request message;
   receiving service information transmitted from the found server terminal, and
   receiving, in a case in which the data is encrypted, an encryption key for decoding the data from the server terminal through the base station.

9. The method of claim 8, wherein the searching comprises:
   selecting a server terminal that desires to receive a service, based on the information associated with the server terminal; and searching for a server terminal able to execute a D2D communication based on a received quality of service information transmitted from the selected server terminal.

10. The method of claim 8, further comprising:
transmitting a reception request message for the data to the server terminal through the base station, in a case in which the server terminal transmits the signal for measuring proximity rather than the data.

11. A method of supporting a device-to-device (D2D) communication in an apparatus for supporting a D2D communication, the method comprising:
allocating a radio resource to a server terminal transmitting service information using a D2D multicast or broadcast communication scheme, based on a server designation request message requesting registration as a server terminal being received from the server terminal,
wherein a state of the radio resource is judged based on the server designation request message; and
transmitting information associated with the server terminal to a terminal located within a cell of a base station,
wherein the service information includes at least one of data of a service provided by the apparatus for D2D communication and a signal for measuring proximity between the apparatus for D2D communication and a receiving terminal receiving the service information, and
wherein the transmitting comprises, in a case in which the service information is transmitted using the D2D multicast communication scheme, encrypting the data and transmitting at least one of the encrypted data and the signal for measuring proximity.

12. The method of claim 11, wherein the radio resource corresponds to a static uplink resource within a preset time interval, and is partitioned and allocated along a time or frequency axis in a case in which service areas overlap between server terminals.

13. An apparatus for executing a device-to-device (D2D) communication, the apparatus comprising:
a request unit to transmit a server designation request message requesting registration as a server terminal to a base station,
wherein a state of a radio resource is judged based on the server designation request message;
a selection unit to select a D2D communication scheme among a D2D multicast communication scheme and a D2D broadcast communication scheme based on the radio resource allocated by the base station; and
a transmission unit to transmit service information using the selected D2D communication scheme,
wherein the service information includes at least one of data of a service provided by the apparatus for D2D communication and a signal for measuring proximity between the apparatus for D2D communication and a receiving terminal receiving the service information, and
wherein the transmitting comprises, in a case in which the service information is transmitted using the D2D multicast communication scheme, encrypting the data and transmitting at least one of the encrypted data and the signal for measuring proximity.

14. An apparatus for executing a device-to-device (D2D) communication, the apparatus comprising:
an obtaining unit to obtain, from a base station, information associated with a server terminal transmitting service information using a D2D multicast or broadcast communication scheme within a cell of the base station and transmitting a server designation request message requesting registration as the server terminal to the base station,
wherein a state of a radio resource is judged based on the server designation request message;
a search unit to search for a server terminal able to execute a D2D communication based on the information associated with the server terminal; and
a receiving unit to receive service information transmitted from the found server Terminal,
wherein the information associated with the server terminal includes information associated with a type of a service provided by the server terminal and information associated with the radio resource allocated to the server terminal,
wherein the service information includes at least one of data of the service provided by the server terminal and a signal for measuring proximity between the server terminal and the apparatus for D2D communication; and
wherein the receiving unit receives, in a case in which the data is encrypted, an encryption key for decoding the data from the server terminal through the base station.

15. An apparatus for supporting a device-to-device (D2D) communication, the apparatus comprising:
an allocation unit to allocate a radio resource to a server terminal transmitting service information using a D2D multicast or broadcast communication scheme, based on a server designation request message requesting registration as a server terminal being received from the server terminal,
wherein a state of the radio resource is judged based on the server designation request message; and
a transmission unit to transmit information associated with the server terminal to a terminal located within a cell of a base station,
wherein the service information includes at least one of data of a service provided by the apparatus for D2D communication and a signal for measuring proximity between the apparatus for D2D communication and a receiving terminal receiving the service information, and
wherein the transmitting comprises, in a case in which the service information is transmitted using the D2D multicast communication scheme, encrypting the data and transmitting at least one of the encrypted data and the signal for measuring proximity.

* * * * *